United States Patent [19] [11] 4,285,423
Fädler et al. [45] Aug. 25, 1981

[54] CLUTCH DISC ASSEMBLY

[75] Inventors: Kurt Fädler, Niederwerrn; Karl-Heinz Werner, Schweinfurt, both of Fed. Rep. of Germany

[73] Assignee: Fichtel & Sachs AG, Schweinfurt, Fed. Rep. of Germany

[21] Appl. No.: 139,476

[22] Filed: Apr. 11, 1980

[30] Foreign Application Priority Data

Apr. 26, 1979 [DE] Fed. Rep. of Germany ....... 2916868

[51] Int. Cl.³ ............................................. F16D 3/14
[52] U.S. Cl. .................................................. 192/106.2
[58] Field of Search ............... 192/106.2, 106.1, 70.16, 192/70.17, 70.18; 64/27 S

[56] References Cited

U.S. PATENT DOCUMENTS

| 3,931,876 | 1/1976 | Beeskow et al. | 192/106.2 |
| 3,982,617 | 9/1976 | Worner | 192/106.2 |
| 3,983,982 | 10/1976 | Worner | 192/106.2 |
| 4,000,794 | 1/1977 | Worner | 192/106.2 |
| 4,036,341 | 7/1977 | Beeskow et al. | 192/106.2 |

FOREIGN PATENT DOCUMENTS 1493002 11/1977 United Kingdom .

Primary Examiner—George H. Krizmanich
Attorney, Agent, or Firm—Toren, McGeady and Stanger

[57] ABSTRACT

In a clutch disc assembly, a hub disc extends outwardly from a hub and a cover disc is provided on each side of the hub disc. The cover discs are angularly movable about the axis of the hub between a neutral position and a pair of terminal positions each spaced on an opposite side of the neutral position. Groups of aligned windows are provided through the hub disc and the cover discs with the windows extending in the circumferential direction around the hub axis. A compression spring extends in the circumferential direction about the hub axis and is located within each group of aligned windows. The compression spring functions as a torsion spring operatively interconnecting the hub disc and the cover discs for resisting angular movement from the neutral to the terminal positions. A plurality of friction units are located between the hub disc and the cover discs and the friction units have different torque values. In a group of aligned windows, the circumferential extent of the window in the hub disc is greater than the circumferential extent of the windows in the cover discs. The compression spring within the group of aligned windows has a circumferential extent in the neutral position equal to the circumferential extent of the cover disc windows.

17 Claims, 3 Drawing Figures

CLUTCH DISC ASSEMBLY

BACKGROUND OF THE INVENTION

This invention relates generally to a clutch disc assembly, especially for motor vehicles comprising:

a hub unit having an axis, said hub unit including a hub and a hub disc fixed on said hub in a position perpendicular to said axis, at least one first circumferentially extending hub disc window with generally radially extending oppositely positioned first and second terminal edges being provided in said hub disc;

a cover disc unit mounted on said hub unit for angular movement about said axis between a neutral angular position and respective terminal angular positions on opposite sides of said neutral angular position, said cover disc unit including, two cover discs, each cover disc being positioned on an opposite side of said hub disc, lining carrier means being provided on one of said cover discs, at least one first circumferentially extending cover disc window with generally radially extending oppositely positioned first and second terminal edges being provided in each of said cover discs, said first cover disc windows of said two cover discs being axially aligned with each other and overlapping said first hub disc window;

at least one first circumferentially extending compression spring with oppositely directed first and second ends being housed within said first hub disc window and said first cover disc windows with said first end adjacent said first terminal edges and said second end adjacent said second terminal edges, said first compression spring functioning as torsion spring means operatively interconnected between said hub unit and said cover disc unit, said torsion spring means resisting angular movement from said neutral angular position toward said terminal angular positions;

friction damping means damping said angular movement of said cover disc unit with respect to said hub unit, said friction damping means including a control disc mounted on said hub unit for angular movement about said axis, a first friction unit operatively interposed between said control disc and said cover disc unit, said first friction unit providing a damping torque having a first torque value, a second friction unit operatively interposed between said control disc and said hub unit, said second friction unit providing a damping torque having a second torque value different from said first torque value, a first abutment member being provided on said control disc, said first abutment member having a spring abutment face and an edge abutment face, said spring abutment face facing said first end of said first compression spring.

A clutch disc assembly of this type is known from British Pat. No. 14 93 002. According to this British patent the damping effect is dependent on the direction of angular movement from said neutral position. The damping effect however remains constant between the neutral angular position and both terminal angular positions.

The present invention is directed toward the task of providing a clutch disc assembly, in which on angular movement from said neutral angular position toward each of said terminal angular positions, the damping effect is changed after a first section of angular movement.

SUMMARY OF THE INVENTION

Briefly, the present invention may be described as a clutch disc assembly especially for motor vehicles, comprising:

a hub unit having an axis, said hub unit including a hub and a hub disc fixed on said hub in a position perpendicular to said axis, at least one first circumferentially extending hub disc window with generally radially extending oppositely positioned first and second terminal edges being provided in said hub disc;

a cover disc unit mounted on said hub unit for angular movement about said axis between a neutral angular position and respective terminal angular positions on opposite sides of said neutral angular position, said cover disc unit including two cover discs, each cover disc being positioned on an opposite side of said hub disc, lining carrier means being provided on one of said cover discs, at least one first circumferentially extending cover disc window with generally radially extending oppositely positioned first and second terminal edges being provided in each of said cover discs, said first cover disc windows of said two cover discs being axially aligned with each other and overlapping said first hub disc window;

at least one first circumferentially extending compression spring with oppositely directed first and second ends being housed within said hub disc window and said first cover disc windows with said first end adjacent said first terminal edges and said second end adjacent said second terminal edges, said first compression spring functioning as torsion spring means operatively interconnected between said hub unit and said cover unit, said torsion spring means resisting angular movement from said neutral angular position toward said terminal angular positions;

friction damping means damping said angular movement of said cover disc unit with respect to said hub unit, said friction damping means including a control disc mounted on said hub unit for angular movement about said axis, a first friction unit operatively interposed between said control disc and said cover disc unit, said first friction unit providing a damping torque having a first torque value, a second friction unit operatively interposed between said control disc and said hub unit, said second friction unit providing a damping torque having a second torque value different from said first torque value, a first abutment member being provided on said control disc, said first abutment member having a spring abutment face and an edge abutment face, said spring abutment face facing said first end of said first compression spring;

wherein the circumferential extent of said first hub disc window is different from the circumferential extent of said first cover disc windows;

the circumferential extent of said first compression spring is—seen in said neutral angular position—substantially equal to the circumferential extent of the shorter one (s) of said first hub disc window and said first cover disc windows;

said edge abutment face of said first abutment member faces the first terminal edge (s) of the longer one (s) of said first hub disc window and said first cover disc windows;

a second abutment member is provided on said control disc having a spring abutment face and an edge abutment face;

said spring abutment face of said second abutment member peripherally faces a second end of a first compression spring and said edge abutment face of said second abutment member faces the second terminal edges(s) of the longer one (s) of a respective first hub disc window and respective first cover disc windows.

Thus, in accordance with the present invention the damping effect of said damping means during angular movement from said neutral angular position toward one of said terminal angular positions is as follows:

In a first section of angular movement the control disc is rotated with the cover disc unit about the hub axis with respect to the hub unit. In this section of angular movement the damping effect is only defined by the second friction unit, which is operatively interposed between said control disc and said hub unit. This first section of angular movement is terminated, when the edge abutment face of one of said abutment members engages the terminal edge or edges of the longer one (s) of said first hub disc window and said first cover disc windows. When the angular movement is continued beyond this first section of angular movement, the control disc is fixed with respect to the hub disc unit, so that the cover disc unit angularly moves with respect to the control disc; in this phase the first friction unit, which is operatively interposed between said control disc and said cover disc unit is effective, whereas the second friction unit is ineffective.

This explanation is true for the angular movement toward both terminal angular positions.

According to a further feature of this invention, the circumferential distance relative to the hub axis between said first and said second abutment member is such, that the spring abutment faces of said first and second abutment members are—seen in neutral angular position—in contact with the first and second end of the respective first compression spring. By this feature it is achieved, that the control disc is rotated with the cover disc unit with respect to the hub unit without delay after the neutral angular position is left.

According to a further feature of this invention at least one second hub disc window extending circumferentially relative to the hub axis is provided in said hub disc and at least one second cover disc window is provided in each of said cover discs, said second hub disc window and said second cover discs windows having equal circumferential extents and being aligned in the axial direction of the hub, when in said neutral angular position, a second compression spring being extending generally in the circumferential direction about the hub of axis and housed in said second hub disc window and said second cover disc windows with the ends of said second compression spring extending transversely of the circumferential direction being in engagement with opposite terminal edges of said second hub disc window and said second cover disc windows which terminal edges extend transversely of the circumferential direction or generally radially of the hub axis. By this feature it is achieved, that the cover disc unit returns automatically into its neutral angular position with respect to said hub unit after cessation of torque transmission through the hub disc assembly.

While it is possible, that the torque value of said first friction unit is smaller, than the torque value of said second friction unit, in most cases it is desired, that the torque value of said first friction unit is greater than the torque value of said second friction unit. This means, that in the above mentioned first section of angular movement, the damping effect is smaller than on further angular movement beyond said first section of angular movement.

According to a preferred embodiment of this invention the first hub disc window is in the circumferential direction about the hub axis longer than the first cover disc windows.

According to still another feature of this invention the first and second abutment members are provided on different substantially radially extending arms of said control disc.

According to still another feature of this invention said arms are directed in opposite directions with respect to said axis and said first and second abutment members are associated with different first compression springs. The co-operation of the first and second abutment member with different first compression springs is of considerable interest for various reasons:

First of all the thickness of the material of the first and second abutment members is distributed on to opposite group of first windows, whereby the accommodation of the abutment member within the assembly is facilitated. Also the construction of the control disc including the abutment members is facilitated and the manufacturing expenses are reduced. Moreover it is easy to locally harden the abutment members.

It is to be noted however, that this invention considers also the possibility, that the first and the second abutment members co-operate with the opposite ends of the same first compression spring and with the terminal edges of the first windows housing this compression spring.

According to a further feature of this invention said first and second abutment members are formed by lugs of said control disc, which lugs are bent out of the plane of the control disc, so as to extend substantially in the axial direction of the hub.

According to still another feature of this invention said lugs are angularly shaped, seen in axial direction, a first leg of said angularly shaped lugs defining the respective abutment member and a second leg of said angularly shaped lugs defining a stiffening rib. Said stiffening rib may have an edge, the height of said edge with respect to the plane of said control disc being substantially equal to the height of the first leg in the apex of said angularly shaped lug, the height of said edge being continuously reduced with increasing distance from said apex.

According to still another important feature of this invention it is provided, that said control disc is located between one side of said hub disc and a first cover disc located on the same side of said hub disc, that the first friction unit comprises a friction disc between said control disc and said first cover disc, that the second friction unit comprises a second friction disc between said control disc and said hub disc, that said cover discs are fixed with respect to each other in axial direction and are axially movable with respect to said hub unit, and that an axial compression spring is provided between the hub disc and the second of said cover discs. By this feature it is achieved, that only one axial compression spring is necessary for obtaining the damping effect of said first and said second friction unit.

According to a further feature of this invention a third friction unit is operatively interposed between said cover disc unit and said hub unit. The damping effect of this third friction unit is superimposed on both the damping effect of said first friction unit and the damping effect of said second friction unit. This third friction unit may comprise a third friction disc interposed between said hub disc and said second cover disc.

In order to provide only one axial spring for obtaining the damping effect of the first, the second and the third friction unit, it is proposed according to a further feature of this invention, that said third friction disc with its face directed toward said second cover disc is in contact with an intermediate disc, said intermediate disc being axially movable with respect to said second cover disc, but angularly fixed with respect to said second cover disc, and that said axial compression spring is interposed between said intermediate disc and said second cover disc.

The second and the third friction units may have substantially an equal torque value. This may be achieved, by shaping said second and said third friction disc with equal frictional value, equal inner diameters and equal outer diameters.

When the first friction disc is desired to have a higher torque value than said second friction disc, this can be obtained by shaping said first friction disc and said second friction disc with equal inner diameter and shaping the first friction disc with a larger outer diameter than said second friction disc.

DETAILED DESCRIPTION OF THE PREFERRED EMBODIMENT

Figure 2:
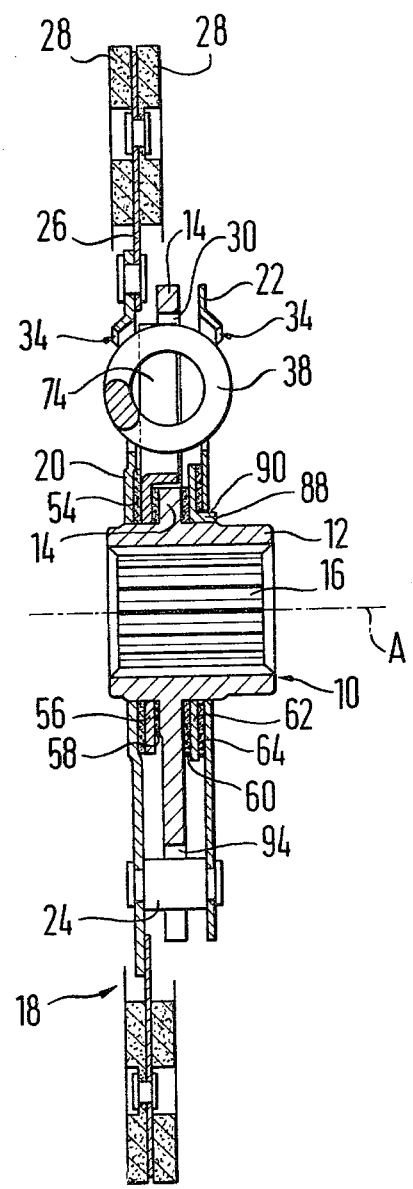
FIG. 2 is a sectional view according to line II—II of FIG. 1.

In FIG. 2 a hub unit is generally designated by 10. This hub unit 10 comprises a hub 12 and a hub disc 14. The hub 12 is formed with splines 16 for mounting the hub disc assembly on, e.g. an input shaft of a motor vehicle gear box.

The axis of the hub 12 is designated by A.

On the hub unit 10 there is mounted a cover disc unit generally designated by 18 and extending in the circumferential direction around the hub axis. The cover disc unit 18 comprises a first cover disc 20 and a second cover disc 22. The cover discs 20 and 22 are located on different sides of the hub disc 14. The cover discs 20 and 22 are connected by rivets 24 in fixed axial and angular position with respect to each other. The cover disc unit 18 is however angularly movable with respect to the hub unit 10 in the circumferential direction about the axis A. On the first cover disc 20 there is provided a lining carrier 26, on which lining carrier 26 clutch linings 28 are mounted.

In the hub disc 14 there are provided two first hub disc windows 30 and 32 extending circumferentially around the hub axis A. In the cover discs 20 and 22 there are provided two group of axially aligned first cover disc windows 34 and 36 extending circumferentially relative to the hub axis A. Within the first hub disc window 30 and the first cover disc windows 34 there is provided a first compression spring 38 extending generally in the circumferential direction relative to the hub axis A, having a first end 38a and a second peripheral end 38b each extending in the generally radial direction relative to the hub axis. The first end 38a of the first compression spring 38 is in engagement with first terminal edges 34a of the first cover disc windows 34 which extends generally radially with respect to the hub axis. The second end 38b of the first compression spring 38 is in engagement with second terminal edges 34b of the first cover disc windows 34 which extend generally radially with respect to the hub axis. As can be seen from FIG. 1 the circumferential extent of the first hub disc window 30 is larger, than the circumferential extent of the first cover disc windows 34b. The first hub disc window 30 is provided with a first terminal edge 30a and a second terminal edge 30b extending in the same general direction as the terminal edges of the first cover disc windows 34.

Within the first hub disc window 32 and the first cover disc windows 36 there is provided a further first compression spring 40 also extending generally circumferentially of the hub axis.

The position of the ends 40a and 40b of said further first compression spring with respect to terminal edges 32a, 32b and 36a,36b of the first hub disc window 32 and the first cover disc windows 36 being identical with that of the ends 38a, 38b of the first compression spring 38, as described above.

In the hub disc 14 and the cover discs 20, 22 there are provided second hub disc and cover disc windows 42 and 44 extending in the circumferential direction about the hub axis A, in which second hub disc and cover disc windows are housed second compression springs 48 and 50 also extending in the generally circumferential direction. The circumferential extents of the second hub disc windows and the second cover disc windows are equal.

Figure 1:
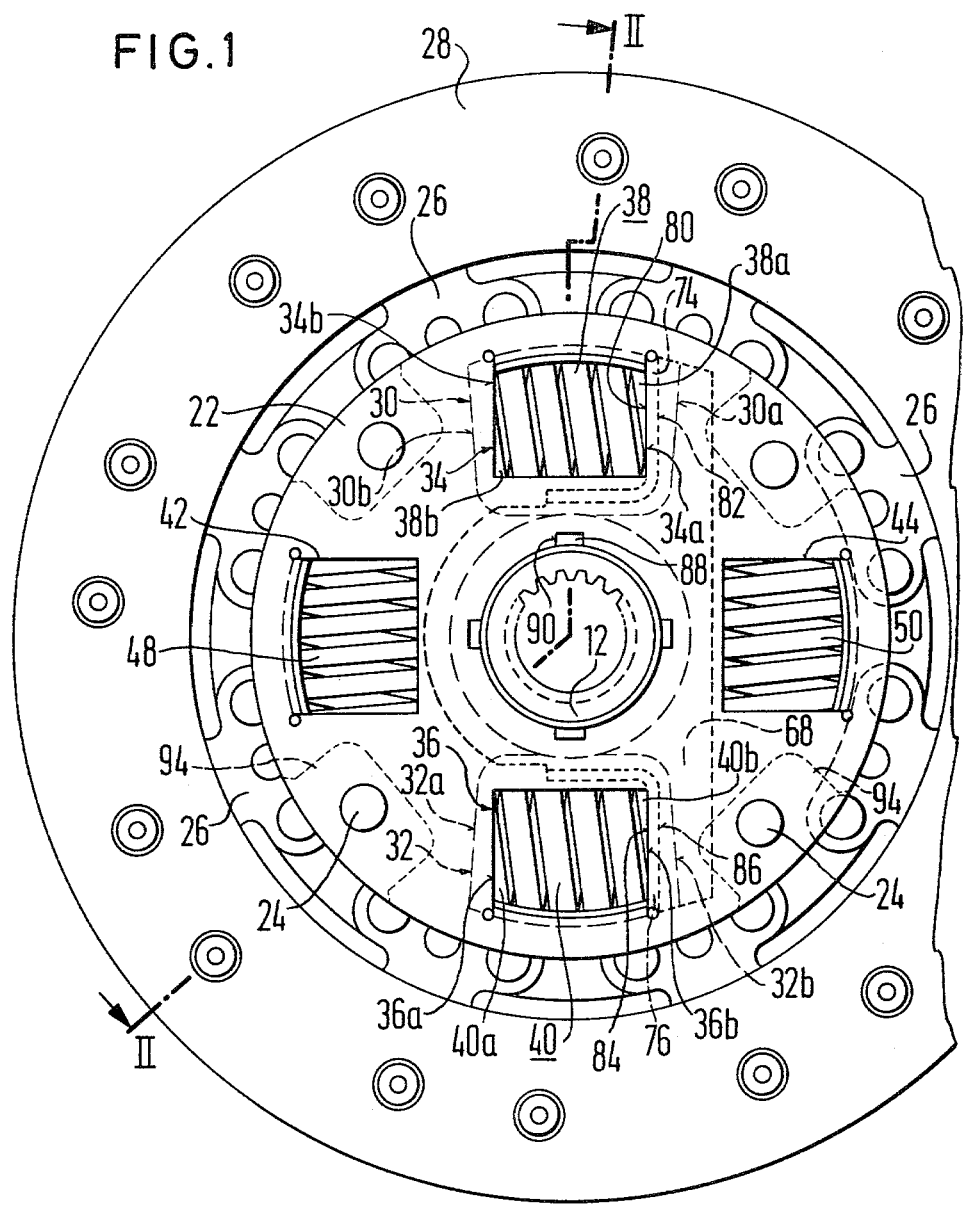
FIG. 1 is a view transverse of the axis of a clutch disc assembly in accordance with the present invention.

In FIG. 1 the hub disc assembly is shown in a neutral angular position.

As shown in FIG. 2 there are provided in the axial direction of the hub between the first cover disc 20 and the hub disc 14 a first friction disc 54, a control disc 56 and a second friction disc 58. Between the other side of the hub disc 14 and the second cover disc 22 there are provided a third friction disc 60, an intermediate disc 62 and an axial compression spring 64.

Figure 3:
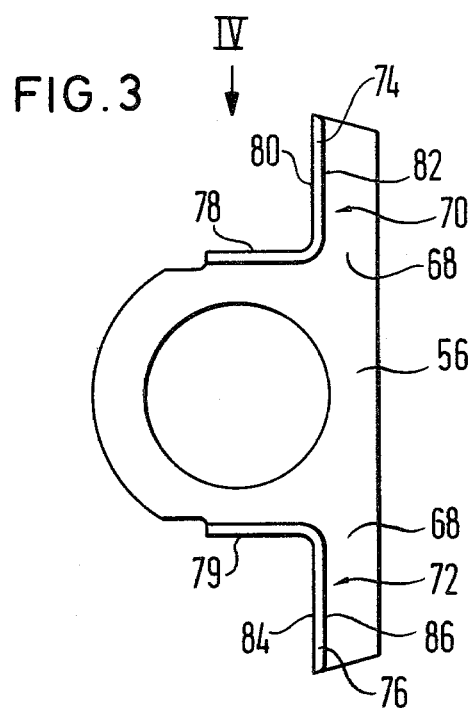
FIG. 3 is a view of the control disc in a plane extending transversely of the axis of the clutch disc assembly and FIG. 4 is a view of the control disc according to arrow IV in FIG. 3.
Figure 4:
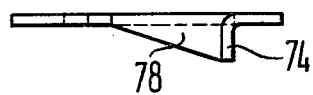

The control disc 56 is illustrated in a more detailed way in FIG. 3. As can be seen from FIG. 3 the control disc 56 is provided with two oppositely directed arms 68 extending generally radially outward from the hub axis. On each of said arms there is provided an axially directed and angularly shaped lug 70 and 72 respectively. The lugs 70, 72, comprise first legs 74 and 76, respectively and second legs 78 and 79 respectively. The first leg 74 serves as a first abutment member having a spring engagement face 80 and an edge engagement face 82. The first other leg 76 serves as a second abutment member having a spring engagement face 84 and an edge engagement face 86. The second legs 78 and 79 serve as stiffening ribs having an edge inclined with respect to the plane of control disc 56 as shown in FIG. 4.

The first abutment member 74 is positioned in axial direction of the hub between the first cover disc 20 and the second cover disc 22 as can be seen from FIG. 2. The same is true for the second abutment member 76. The first abutment member 74 is also illustrated in FIG 1. One can see from FIG. 1, that the spring engagement face 80 faces the first end 38a of the first compression spring 38, whereas the edge engagement face 82 faces in the opposite direction toward the first terminal edge 30a of the hub disc window 30.

The second abutment member 76 is equally illustrated in FIG. 1. One can see from FIG. 1, that the spring engagement face 84 of the abutment member 76 faces the second end 40b of the first compression spring 40, whereas the edge abutment face 86 faces the second terminal edge 32b of the first hub disc window 32.

The intermediate disc 62 is connected for common rotation to the second cover disc 22 by axial lugs 88, which axial lugs 88 engage slots 90 at the inner periphery of the second cover disc 22. So the intermediate disc 62 is axially movable with respect to the second cover disc 22. The axial compression spring 64 exerts axial pressure on the first friction disc 54, the second friction disc 58 and the third friction disc 60. The second and the third friction discs 58 and 60 have equal inner and outer diameters. The first friction disc 54 has the same inner diameter as the second and the third friction disc 58 and 60 respectively, but has a larger outer diameter, than the second and the third friction discs. The first friction disc 54 defines a first friction unit having a first damping torque value; the second friction disc 58 defines a second friction unit having a second damping torque value and the third friction unit 60 defines a third friction unit having a third damping torque value. The first damping torque value is larger than the second and the third damping torque value.

For illustrating the operation it is assumed now, that the hub unit 10 is fixed in angular direction and that the cover disc unit 18 is angularly moved about the axis A with respect to the hub unit 10 starting from the neutral angular position as shown in FIG. 1. It is further assumed, as viewed in FIG. 1, that the cover disc unit is angularly moved in the clock wise direction. When this angular movement in the clock wise direction begins, the second terminal edge 34b of the first cover disc windows 34 pushes the first compression spring 38 also in clock wise direction. The first end 38a of the first compression spring 38 acts on the first abutment member 74, so that also the control disc 56 is moved in the clock wise direction, until the first abutment member 74 engages by its edge engagement face 82 the first terminal edge 30a of the first hub disc window 30. At this moment the first section of the angular movement is terminated. During this first section of angular movement, the second friction disc 58 damps the movement of the control disc 56 and thereby of the cover disc unit 18 with respect to the hub unit 10. An additional damping effect during this first section of angular movement is obtained by the third friction disc 60. When the first abutment member 74 engages the first terminal edge 30a of the hub disc window 30 and the angular movement of the cover disc unit 18 with respect to the hub unit 10 in clock wise direction is continued, the control disc 56 is immobilised with respect to the hub unit 10. Therefore the second friction disc 58 is ineffective now. The first cover disc 20 is however rotated now with respect to the control disc 56, so that the first friction disc 56 becomes effective and damps the movement of the cover disc unit with respect to the hub unit. The damping action afforded by the third friction disc 60 exists also during said second section of angular movement. During both sections of angular movement the second compression springs 48 and 50 are elastically compressed between the respective edges of the second hub disc windows and cover disc windows 42 and 44.

When the torque acting on the cover disc unit 18 in a clock wise direction is removed, the cover disc unit 18 returns into the neutral position. At the beginning of this return movement, the control disc 56 is still immobilised with respect to the hub unit 10 by the first compression spring 38 pressing abutment member 74 against the first terminal edge 30a of the first hub disc window 30. During this first section of the return movement, the first friction disc 54 provides a damping effect. Thereafter in a second section of return movement the first compression spring 40 is acted upon by the first terminal edge 36a of the cover disc windows 36 in counter clock wise direction and pushes the second abutment member 76 also in counter clock wise direction, so that the control disc 56 is returned in counter clock wise direction into the neutral angular position as shown in FIG. 1. During this second section of return movement the second friction disc 58 is dampingly effective, whereas the first friction disc 54 is ineffective.

As the first friction disc 54 provides a higher damping torque value it is achieved, that during the first section of the angular movement in clock wise direction damping is smaller, during a second section of clock wise movement the damping is greater, during a first section of return (counter clock wise) movement damping is greater and during a second section of return movement (counter clock wise movement) damping is smaller again. When the cover disc unit 18 is deflected in counter clock wise direction with respect to the hub unit as regarded in FIG. 1 the analogous is true.

The terminal angular positions of the cover disc unit 18 with respect to the hub unit 10 are defined by the rivets 24, which engage terminal edges of one or more recesses 94.

It is readily to be understood, that the damping torque value of the first friction disc 54 may also be smaller, than the damping torque value of the second friction disc 58. The first, second and third friction discs 54,58 and 60 respectively can have different friction values with respect to the adjacent faces. Thereby it is possible to adapt the behaviour of the clutch disc assembly to the specific cases of use.

What is claimed is:

1. In a clutch disc assembly, especially for motor vehicles, comprising: a hub unit having an axis, said hub unit including a hub and a hub disc fixed on said hub in a position perpendicular to said axis, at least one first hub disc window extending circumferentially relative to said hub axis with oppositely positioned first and second terminal edges extending generally radially of the hub axis being provided in said hub disc; a cover unit mounted on said hub unit for angular movement about said hub axis between a neutral angular position and respective terminal angular positions on opposite sides of said neutral angular position, said cover disc unit including two cover discs, each cover disc being positioned on an opposite side of said hub disc, lining carrier means being provided on one of said cover discs, at least one first cover disc window extending circumferential relative to said hub axis with oppositely positioned first and second terminal edges extending generally radially of the hub axis being provided in each of said cover discs, said first cover disc windows of said two cover discs being axially aligned with each other and in overlapping relation with said first hub disc window; at least one first compression spring extending in the circumferential direction relative to the hub axis with oppositely directed first and second ends extending generally in the radial direction relative to said hub axis being housed within said first hub disc window and said first cover disc windows with said first end adjacent said first terminal edges and said second end adjacent said second terminal edges, said first compression spring functioning as torsion spring means operatively interconnecting said hub unit and said cover disc unit, said torsion spring means resisting angular movement from said neutral angular position toward said terminal angular positions; friction damping means damping said angular movement of said cover disc unit with respect to said hub unit, said friction damping means including a control disc mounted on said hub unit for angular movement about said hub axis; a first friction unit operatively interposed between said control disc and said cover disc unit, said first friction unit providing a damping torque having a first torque value; a second friction unit operatively interposed between said control disc and said hub unit, said second friction unit providing a damping torque having a second torque value different from said first torque value; a first abutment member being provided on said control disc, said first abutment member having a spring abutment face and an edge abutment face, said spring abutment face facing in the circumferential direction around said hub axis toward said first end of said first compression spring; the improvment which includes, that the circumferential extent of said first hub disc window is different from the circumferential extent of said first cover disc windows; that the circumferential extent of said first compression spring is—seen in said neutral angular position—substantially equal to the circumferential extent of the shorter one of said first hub disc window and said first cover disc windows in the circumferential direction around said hub axis; that said edge abutment face of said first abutment member faces the first terminal edge of the longer one of said first hub disc window and said first cover disc windows in the circumferential direction around said hub axis; that a second abutment member is provided on said control disc having a spring abutment face and an edge abutment face; that a further first compression spring extending in the circumferential direction around said hub axis is located in another said first hub disc window and in another pair of said first cover disc windows, said further first compression spring having oppositely directed first and second ends, that said spring abutment face of said second abutment member faces the second end of said further first compression spring and said edge abutment face of said second abutment member faces the second terminal edge of the longer one of said another first hub disc window and another first cover disc windows.

2. A clutch disc assembly as set forth in claim 1, wherein the circumferential distance between said first and second abutment members is such, that the spring abutment faces of said first and second abutment members are—seen in said neutral angular position—in contact with the first and second end of the respective first compression spring.

3. A clutch disc assembly as set forth in claim 1 wherein at least one second circumferentially extending hub disc window is provided in said hub disc and at least one second cover disc window is provided in each of said cover discs, said second hub disc window and said second cover disc windows having opposite terminal edges extending generally radially relative to said hub axis and having equal circumferential extents and being aligned in the axial direction of said hub unit when in said neutral angular position, a second compression spring extending in the circumferential direction about said hub axis being housed in said second hub disc window and said second cover disc windows with the opposite ends of said second compression spring being in engagement with opposite terminal edges of said second hub disc window and said second cover disc windows.

4. A clutch disc assembly as set forth in claim 1, wherein the torque value of said first friction unit is greater, than the torque value of said second friction unit.

5. A clutch disc assembly as set forth in claim 1, wherein said first hub disc window is circumferentially longer than said first cover disc windows.

6. A clutch disc assembly as set forth in claim 1, wherein said first and second abutment members are provided on different generally radially extending arms of said control disc.

7. A clutch disc assembly as set forth in claim 6, wherein said arms are directed in substantially opposite generally radially extending directions with respect to said hub axis, and wherein each of said first and second abutment members is associated with a different one of said first compression springs.

8. A clutch disc assembly as set forth in claim 1, wherein said first and second abutment members are formed by lugs of said control disc which lugs are bent, so as to extend in the substantially axial direction of said hub unit.

9. A clutch disc assembly as set forth in claim 8, wherein said lugs are angularly shaped, viewed transversely of the axial direction of said hub unit, a first leg of said angularly shaped lugs defining the respective said abutment member and a second leg of said angularly shaped lug defining a stiffening rib.

10. A clutch disc assembly as set forth in claim 9, wherein said stiffening rib has an edge spaced outwardly from the plane of said control disc which extends transversely of said axis, the height of said edge with respect to said plane of said control disc being substantially equal to the height of the first leg outwardly therefrom at the apex of said angularly shaped lug, and the height of said edge converging toward said plane of said control disc as the distance of said edge increases from said apex.

11. A clutch disc assembly as set forth in claim 1, wherein said control disc is provided between one side of said hub disc and a first one of said cover disc located on the same side of said hub disc, the first friction unit comprises a first friction disc between said control disc and said first cover disc, the second friction unit comprises a second friction disc between the control disc and said hub disc, said cover discs are fixed with respect to each other in axial direction and are axially movable with respect to said hub unit and an axial compression spring is provided between the hub disc and a second one of said cover discs.

12. A clutch disc assembly set forth in claim 1, wherein a third friction unit is operatively interposed between said cover disc unit and said hub unit.

13. A clutch disc assembly as set forth in claim 12, wherein said third friction unit comprises a third friction disc interposed between the opposite side of said hub disc from said control disc and said second cover disc.

14. A clutch disc assembly as set forth in claim 13, wherein an intermediate disc located between the face of said third friction disc directed toward said second cover disc and said second cover disc, said intermediate disc being axially movable with respect to said second cover disc, but angularly fixed with respect to said second cover disc, and wherein said axial compression spring being interposed between said intermediate disc and said second cover disc.

15. A clutch disc assembly as set forth in claim 12, wherein said second and said third friction unit have substantially the same torque value.

16. A clutch disc assembly as set forth in claim 14, wherein said second and said third friction disc have equal frictional values, equal inner diameters and equal outer diameters.

17. A clutch disc assembly as set forth in claim 11, wherein said first friction disc and said second friction disc have equal inner diameters, the outer diameter of said first friction disc being larger, than the outer diameter of said second friction disc.

* * * * *